US010942750B2

(12) United States Patent
Atta et al.

(10) Patent No.: US 10,942,750 B2
(45) Date of Patent: Mar. 9, 2021

(54) SYSTEM AND METHOD TO SECURELY LOAD NON-UEFI BASED FILE FORMAT AS OEM BASED UEFI CUSTOM CAPSULE FORMAT IN UEFI LOADER

(71) Applicant: DELL PRODUCTS L.P., Round Rock, TX (US)

(72) Inventors: Venkata Atta, Bangalore (IN); Shekar Babu Suryanarayana, Bangalore (IN); Sumanth Vidyadhara, Bangalore (IN)

(73) Assignee: DELL PRODUCTS L.P., Round Rock, TX (US)

( * ) Notice: Subject to any disclaimer, the term of this patent is extended or adjusted under 35 U.S.C. 154(b) by 152 days.

(21) Appl. No.: 16/370,129

(22) Filed: Mar. 29, 2019

(65) Prior Publication Data

US 2020/0310824 A1  Oct. 1, 2020

(51) Int. Cl.
*G06F 9/00* (2006.01)
*G06F 15/177* (2006.01)
*G06F 9/4401* (2018.01)
*G06F 9/445* (2018.01)
*G06F 21/57* (2013.01)
*G06F 21/64* (2013.01)
*H04L 9/32* (2006.01)

(52) U.S. Cl.
CPC ........ *G06F 9/4406* (2013.01); *G06F 9/44505* (2013.01); *G06F 15/177* (2013.01); *G06F 21/57* (2013.01); *G06F 21/64* (2013.01); *H04L 9/3247* (2013.01)

(58) Field of Classification Search
CPC .. G06F 9/4406; G06F 9/44505; G06F 15/177; G06F 21/64
See application file for complete search history.

(56) References Cited

U.S. PATENT DOCUMENTS

| 7,363,482 | B2 | 4/2008 | Zimmer et al. |
| 7,676,800 | B2 | 3/2010 | Kinney |
| 8,364,974 | B2 | 1/2013 | Zimmer et al. |
| 8,751,783 | B2 | 6/2014 | Piwonka et al. |
| 9,721,101 | B2 | 8/2017 | Jones et al. |
| 10,025,587 | B2 | 7/2018 | Lu |

FOREIGN PATENT DOCUMENTS

| CN | 103777981 A | 5/2014 |
| CN | 105825131 B | 12/2018 |
| EP | 2141625 B1 | 6/2009 |
| JP | 2006092544 A | 4/2006 |

*Primary Examiner* — Nitin C Patel

(74) *Attorney, Agent, or Firm* — Jackson Walker LLP; Christopher J. Rourk

(57) ABSTRACT

A system for secure load of binary code, comprising a processor, a data memory device configured to be accessible by the processor, a data capsule configured to be accessible by the processor, the data capsule including a data signature and a network interface device configured to authenticate the data signature over a network using a remote data signature verification server.

17 Claims, 2 Drawing Sheets

SYSTEM AND METHOD TO SECURELY LOAD NON-UEFI BASED FILE FORMAT AS OEM BASED UEFI CUSTOM CAPSULE FORMAT IN UEFI LOADER

TECHNICAL FIELD

The present disclosure relates generally to information handling system start-up processing, and more specifically to a system and method to securely load a non-UEFI based file format as an OEM based UEFI custom capsule format in a UEFI loader.

BACKGROUND OF THE INVENTION

Firmware refers to processor operating instructions that are stored in a memory device, and which are used to control the start-up or "booting" of a processor. The Unified Extensible Firmware Interface (UEFI) is a firmware specification for operating system (OS) compatibility with firmware. While UEFI provides an improvement over the Basic Input/Output System (BIOS) firmware that preceded UEFI, it still suffers from numerous shortcomings, such as the inability to securely load OS programs.

SUMMARY OF THE INVENTION

A system for secure load of binary code is disclosed. The system includes a processor, a data memory device configured to be accessible by the processor and a data capsule configured to be accessible by the processor. The data capsule includes a data signature, and a network interface device is configured to authenticate the data signature over a network using a remote data signature verification server.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

Figure 1:
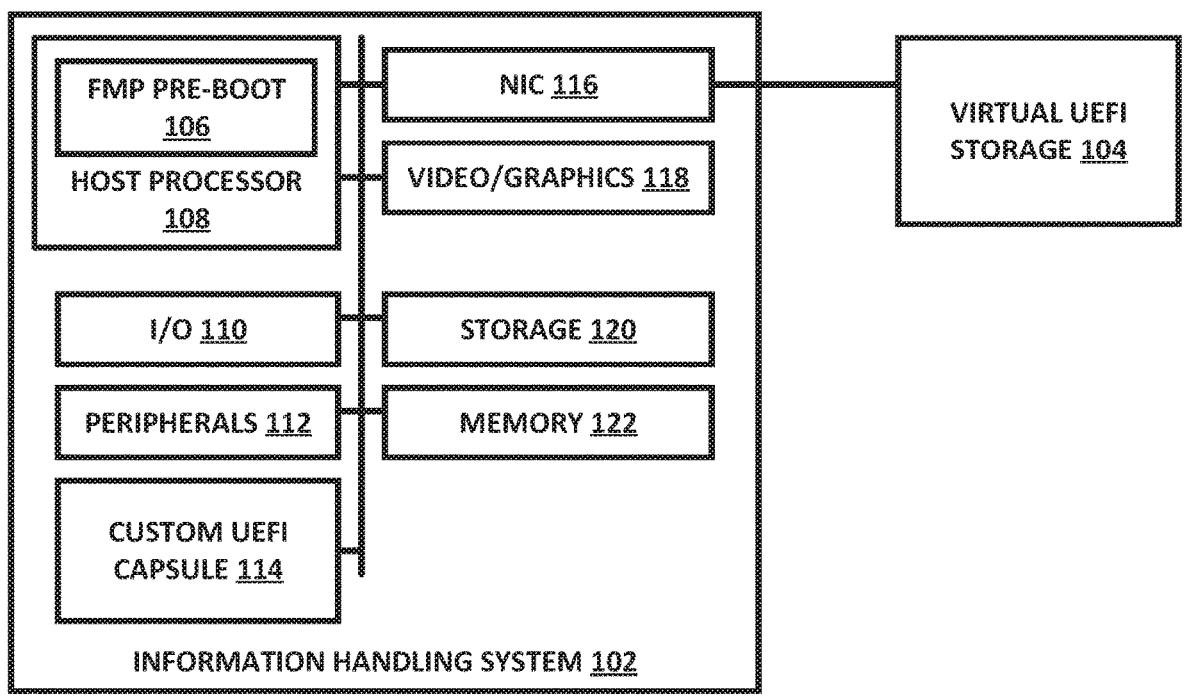
FIG. 1 is a diagram of a system to securely load a custom firmware capsule, in accordance with an example embodiment of the present disclosure.

In the description that follows, like parts are marked throughout the specification and drawings with the same reference numerals. The drawing figures may be to scale and certain components can be shown in generalized or schematic form and identified by commercial designations in the interest of clarity and conciseness.

The process of booting a processor starts with executing firmware that has been stored into a predetermined data memory address of a data memory device of the processor. Prior to booting of a processor, it is necessary to load firmware for the processor into a memory device of the processor, and that is usually done by the original equipment manufacturer (OEM). The firmware controls the operations of the processor, and does not change after booting. Because firmware is stored in the processor memory before booting, it is considered secure because it would be difficult to access and modify the firmware.

One of the primary functions of the firmware is to load the OS. At present, the secured pre-boot firmware environment does not have a mechanism to allow it to trust non-EFI or non-executable files while loading files from an external source, such as a hard drive or over a network. For example, some OS software can require a preloaded certificate to establish an https connection to a support server. This certificate is placed in the firmware. However, neither the certificate nor the firmware are digitally signed, because digital signatures can typically only be used once and may have a limited lifetime to prevent brute force attempts to guess the digital signature, which does not allow them to be preloaded. This configuration creates a security threat in compromising the certificate, because it can be discovered by a third party and used to attack either the processor or potentially the server.

For example, a process called "Secure Boot" causes the firmware to determine whether the system boot loader software contains a cryptographic key that has been authorized by a database. With adequate signature verification in the next-stage boot loader(s), kernel, and, potentially, user space, it is possible to prevent the execution of unsigned code. However, Secure Boot does not utilize cryptographic keys with remote attestation, which makes it vulnerable to attack.

A system and method are disclosed to securely load binary file formats specific to UEFI, although the system and method can also or alternatively be used with other firmware processes. For example, GIF files can be required for the BIOSConnect UI, Cacert.PEM can be used in an HTTPS connection using BIOS Connect, XML or UBJSON binary files can be used in UEFI, or other suitable binary file formats can also or alternatively be used. The present disclosure provides a system and method to securely load a suitable custom non-attested binary file in UEFI.

The system and method of the present disclosure can be used to authenticate a suitable binary file used in UEFI modules for custom handling. In one example embodiment, a UEFI Capsule Header GUID can be used to determine whether corresponding GUID data is stored in a suitable location, such as in an EFI-based custom binary file version in a secure centralized server. If it is determined that a match exists, then header information can be extracted from predetermined data fields in the file format. The header information can identify the version of the EFI-based custom binary that is supported. A binary count or list of encapsulated binary files can also be included, as well as authentication information for the binary file. Data fields can also include the size of the authorization information and the location of the metadata for the binary files.

In another example embodiment, a UEFI-based custom binary handling data flow can include checking the authorization information based on a platform policy, such as by using SecureBoot, a hash, a CRC32 process, proprietary system keys, or in other suitable manners. The process can load the metadata of the binary file based on a custom GUID in the version information, where the GUID metadata handling can be different for each of the defined GUIDs. For example, if the binary file is an XML file, a C14N authentication of the XML file can be performed. In another example, a GIF image can be verified and loaded using a proprietary UI handling library. A plurality of binary files can be used, where each of the binary files can be encapsulated as a custom binary capsule file for handling in the system.

The disclosed system and method for securely loading a binary file format at runtime can use an EFI-based custom binary file version or other suitable data structures. Custom header information and business logic in UEFI can be used that are based on the binary file type used in the UEFI subsystem. While the same binary files can be loaded using the firmware volume, there are security issues with these files and vulnerabilities associated with these files, because they are not authenticated. The system and method of the present disclosure address these shortcomings.

FIG. 1 is a diagram of a system 100 to securely load a custom firmware capsule, in accordance with an example embodiment of the present disclosure. System 100 includes information handling system 102, virtual UEFI storage 104, FMP pre-boot 106, host processor 108, I/O 110, peripherals 112, customer UEFI capsule 114, network interface card 116, video/graphics 118, storage 120 and memory 122, each of which can be implemented in hardware or a suitable combination of hardware and software.

Information handling system 102 can be a desktop computer, a laptop computer, a server computer, a handheld computer or other suitable devices. The components of information handling system 102 can be provided by the OEM or updated by a user after purchase, and can include hardware components, hardware components with associated firmware or other suitable devices.

Virtual UEFI storage 104 can be a central data storage device or facility for a network, or other suitable systems or devices. In one example embodiment, virtual UEFI storage 104 can be accessed over a secure network, and can include binary files associated with different information handling system models, different GUIDs or other suitable identifiers. Virtual UEFI storage 104 can be accessed over a network by information handling system 102 to obtain secure OS binary files or other suitable code.

Firmware management protocol (FMP) pre-boot 106 can be used to update firmware for devices on information handling system 102, such as based on Chapter 32 of UEFI Specification 2.4 or in other suitable manners. FMP pre-boot 106 can provide new firmware payload components of a firmware update process to a random access memory (RAM), such as by using FMP for loading to non-volatile memory of an adapter. In one example embodiment, FMP pre-boot 106 can be used to verify that a signature process has been properly used before loading binary OS files, or other suitable processes can also or alternatively be provided.

Host processor 108 can include a central processing unit that is configured to run a host OS in a first mode of operation, and/or configured to run an FMP-based pre-boot software (e.g., Dell Life Cycle Controller available from Dell Products L.P. of Round Rock, Tex.) in a second mode of operation as needed. Host processor 108 can be a service processor, embedded processor, or other suitable processors.

Video/graphics 118, storage 120, memory 122, I/O 110 and peripherals 112 can have the structure, and perform the functions known to those of skill in the art. Besides memory 122, host processor 108 can include cache memory for storage of frequently accessed data, and storage 120 can include extended memory for host processor 108. Network interface card 116 provides network interface functionality to allow virtual UEFI storage 104 to be accessed by information handling system 102.

Custom UEFI capsule 114 provides for securely loading a binary file format at runtime using a custom capsule that is based on a secure binary GUID. Custom header information and business logic can be provided in a UEFI-compatible format, to facilitate secure installation of OS components. Authenticated binary files can be securely maintained at a predetermined virtual UEFI device path location, which can be used for loading these files later after authentication. For example, a wireless driver can be loaded using the authenticated binary firmware files from the virtual UEFI device path.

Figure 2:
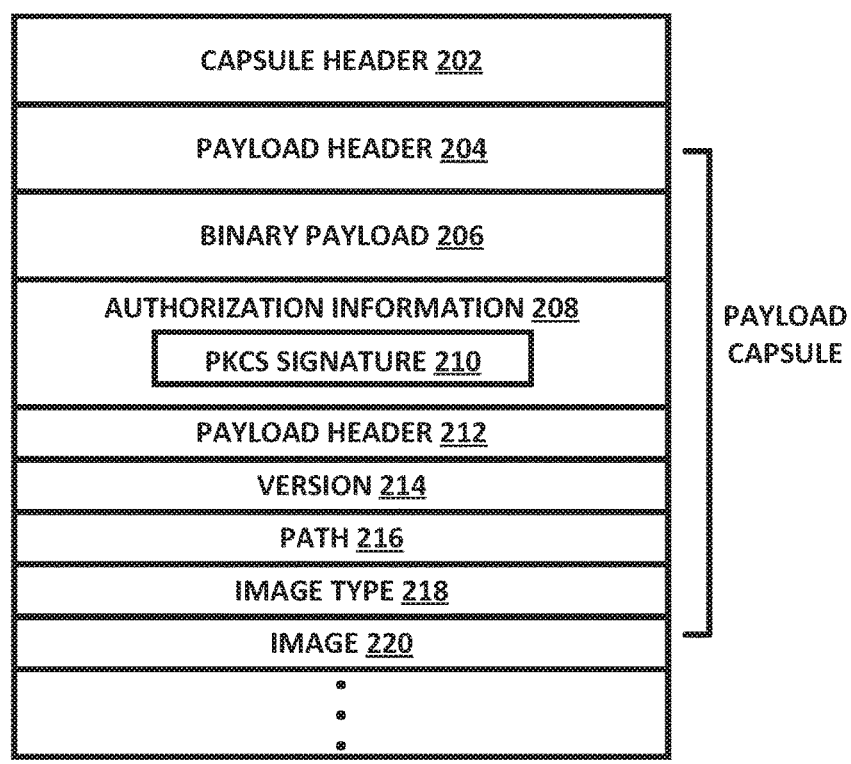
FIG. 2 is a diagram of a firmware capsule in accordance with an example embodiment of the present disclosure.

FIG. 2 is a diagram of a firmware capsule 200 in accordance with an example embodiment of the present disclosure. Firmware capsule 200 includes capsule header 202 and a plurality of payload capsules that each includes a separate payload header 204, binary payload 206, authorization information 208, PKCS signature 210, payload header 212, version 214, path 216, image type 218 and image 220, each of which can be implemented in hardware or a suitable combination of hardware and software.

Capsule header 202 provides identification data for uniquely identifying a capsule. In one example embodiment, capsule header 202 can include version data for identifying the version of the capsule, as well as other suitable data.

Payload header 204 provides identification data for uniquely identifying binary payload. In one example embodiment, payload header 204 can be used to distinguish different binary payload packets that are contained in firmware capsule 200, as well as other suitable data.

Binary payload 206 can include operating system code or other suitable binary payload. In one example embodiment, binary payload 206 can be used to control the operation of a host processor or other suitable devices.

Authorization information 208 can include authentication information for binary payload 206 or other suitable data. In one example embodiment, authorization information 208 can include platform policy data, such as based on a type of platform, a version of a platform or other suitable data.

PKCS signature 210 can include a public key cryptography standard signature or other suitable signatures for protecting the contents of binary payload 206 or other suitable data. In one example embodiment, PKCS signature 210 can be provided by virtual UEFI storage 104 or other suitable sources, and can be used to control secure access to binary payload 206 or other data.

Payload header 212 can include metadata and other suitable header data for binary payload 206. In one example embodiment, payload header 212 can include version 214, path 216, image type 218, image 220 and other suitable data. Version 214 can include version data for binary payload 206 or other suitable data. Path 216 can include the location of the binary file to be created in the virtual UEFI device path, and can be used for other BIOS EFIs to load the same data or other related data. Image type 218 can be a wireless BIN file for wireless driver initialization, BIOS binary files for system configuration (such as XML, JSON or ODATA binary format) or other suitable data. Image 220 can include an actual image of binary payload 206 or other suitable data.

Figure 3:
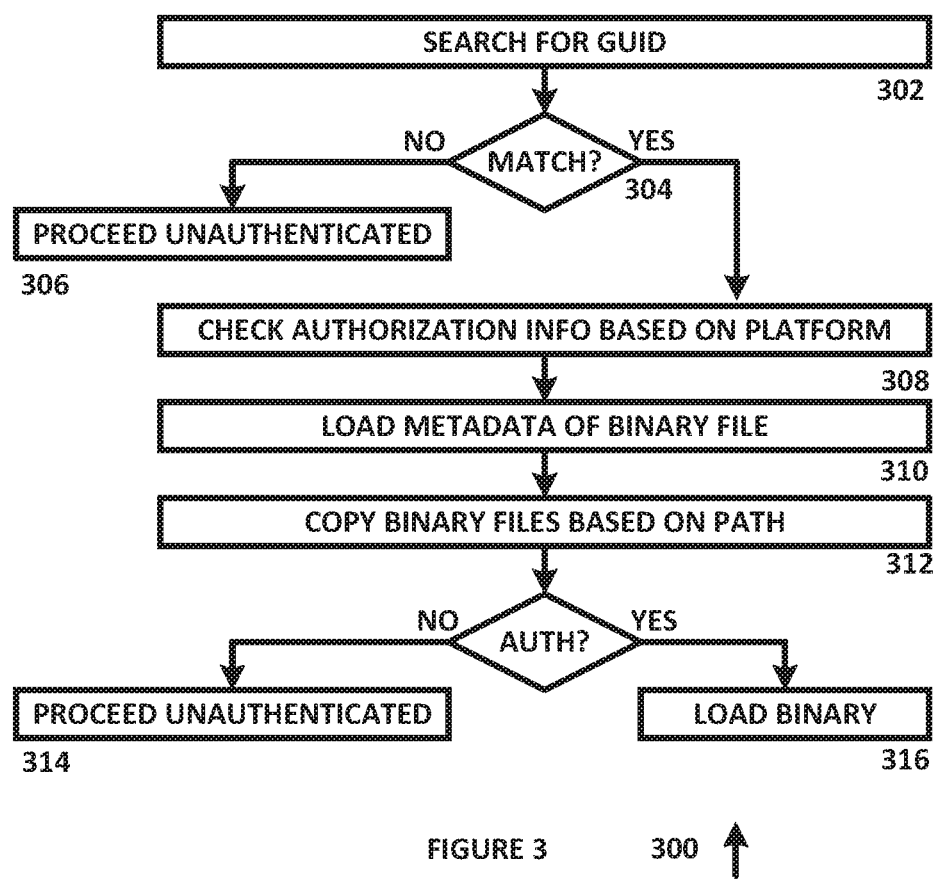
FIG. 3 is a diagram of an algorithm for securely loading a firmware capsule, in accordance with an example embodiment of the present disclosure.

FIG. 3 is a diagram of an algorithm 300 for securely loading a firmware capsule, in accordance with an example embodiment of the present disclosure. Algorithm 300 can be implemented in hardware or a suitable combination of hardware and software.

Algorithm 300 begins at 302, where a search for a GUID is performed. In one example embodiment, a GUID for a firmware capsule can be transmitted to a remote server to determine whether it matches any data at the remote server, or other suitable processes can also or alternatively be used. In another example embodiment, a capsule binary GUID process can be used where it is determined whether the capsule format is an OEM secure binary GUID, where the OEM defines the process to be used for the capsule binary GUID. Likewise, other suitable processes can also or alternatively be used. The algorithm then proceeds to 304.

At 304, it is determined whether a match has been found. In one example embodiment, the match can include a match of a portion of the GUID, a match of an earlier version or other suitable matches. If it is determined that a match has not been found, the algorithm proceeds to 306 where firmware load continues without authentication. In one example embodiment, a non-secure firmware load can be used to load a local version of OS binary files or other suitable data. Otherwise, the algorithm proceeds to 308.

At 308, a check is performed for authorization information based on the associated processing platform. In one example embodiment, a GUID can be associated with a predetermined type of processing platform, and if the authorization information does not match the current platform information, an error can be generated, a local version of an OS binary data file can be used or other suitable processes can also or alternatively be used. The algorithm then proceeds to 310.

At 310, metadata of a binary file is loaded. In one example embodiment, the binary files can be loaded into a local memory of a processor or other suitable locations. The algorithm then proceeds to 312.

At 312, the binary files are copied based on a virtual UEFI device path. In one example embodiment, the device path data can be obtained from the payload metadata or in other suitable manners. The algorithm then proceeds to 314.

At 314, it is determined whether the firmware has been authorized. If the firmware has not been authorized, the algorithm proceeds to 314, where firmware load proceeds without authentication. Otherwise the algorithm proceeds to 316 where the unencrypted binary file is loaded.

In operation, algorithm 300 allows binary files to be securely obtained and loaded during firmware booting through the use of authentication. While algorithm 300 is shown as a flowchart, the functions associated with algorithm 300 can also or alternatively be implemented using object oriented programming, state diagrams or in other suitable manners.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. A software system is typically created as an algorithmic source code by a human programmer, and the source code algorithm is then compiled into a machine language algorithm with the source code algorithm functions, and linked to the specific input/output devices, dynamic link libraries and other specific hardware and software components of a processor, which converts the processor from a general purpose processor into a specific purpose processor. This well-known process for implementing an algorithm using a processor should require no explanation for one of even rudimentary skill in the art. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. A system can receive one or more data inputs, such as data fields, user-entered data, control data in response to a user prompt or other suitable data, and can determine an action to take based on an algorithm, such as to proceed to a next algorithmic step if data is received, to repeat a prompt if data is not received, to perform a mathematical operation on two data fields, to sort or display data fields or to perform other suitable well-known algorithmic functions. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system for secure load of binary code, comprising: a processor; a data memory device configured to be accessible by the processor; a data capsule configured to be accessible by the processor, the data capsule including a data signature; wherein the data capsule comprises a custom Unified Extensible Firmware Interface (UEFI) data capsule with a plurality of payload capsules and a signature data field for each payload capsule, and the processor is configured to implement the custom UEFI data capsule and each of the plurality of payload data capsules after authenticating the signature data field for the payload data capsule; and a network interface device configured to authenticate the data signature over a network using a remote data signature verification server.

2. The system of claim 1 wherein the data capsule comprises a custom Unified Extensible Firmware Interface (UEFI) data capsule.

3. The system of claim 1 wherein the data capsule comprises a custom Unified Extensible Firmware Interface (UEFI) data capsule and the processor is configured to implement the custom UEFI data capsule.

4. The system of claim 1 wherein the data capsule comprises a custom Unified Extensible Firmware Interface (UEFI) data capsule with a plurality of payload capsules.

5. The system of claim 1 wherein the data capsule comprises a custom Unified Extensible Firmware Interface (UEFI) data capsule with a plurality of payload capsules and the processor is configured to implement the custom UEFI data capsule and the plurality of payload data capsules.

6. The system of claim 1 wherein the data capsule comprises a custom Unified Extensible Firmware Interface (UEFI) data capsule with a plurality of payload capsules and at least one signature data field.

7. The system of claim 1 wherein the data capsule comprises a custom Unified Extensible Firmware Interface (UEFI) data capsule with a plurality of payload capsules and at least one signature data field, and the processor is configured to implement the custom UEFI data capsule and the plurality of payload data capsules after authenticating the at least one signature data field.

8. The system of claim 1 wherein the data capsule comprises a custom Unified Extensible Firmware Interface (UEFI) data capsule with a plurality of payload capsules and a signature data field for each payload capsule.

9. A method for secure load of binary code, comprising: executing boot code with a processor; accessing a data capsule with the processor during the boot process, the data capsule including a data signature; wherein the data capsule comprises a custom Unified Extensible Firmware Interface (UEFI) data capsule with a plurality of payload capsules and a signature data field for each payload capsule, and further comprising implementing the custom UEFI data capsule and each of the plurality of payload data capsules after authenticating the signature data field for the payload data capsule and authenticating the data signature over a network using a remote data signature verification server.

10. The method of claim 9 wherein the data capsule comprises a custom Unified Extensible Firmware Interface (UEFI) data capsule.

11. The method of claim 9 wherein the data capsule comprises a custom Unified Extensible Firmware Interface (UEFI) data capsule and further comprising implementing the custom UEFI data capsule with the processor.

12. The method of claim 9 wherein the data capsule comprises a custom Unified Extensible Firmware Interface (UEFI) data capsule with a plurality of payload capsules.

13. The method of claim 9 wherein the data capsule comprises a custom Unified Extensible Firmware Interface (UEFI) data capsule with a plurality of payload capsules and further comprising implementing the custom UEFI data capsule and the plurality of payload data capsules with the processor.

14. The method of claim 9 wherein the data capsule comprises a custom Unified Extensible Firmware Interface (UEFI) data capsule with a plurality of payload capsules and at least one signature data field.

15. The method of claim 9 wherein the data capsule comprises a custom Unified Extensible Firmware Interface (UEFI) data capsule with a plurality of payload capsules and at least one signature data field, and further comprising implementing the custom UEFI data capsule and the plurality of payload data capsules after authenticating the at least one signature data field.

16. The method of claim 9 wherein the data capsule comprises a custom Unified Extensible Firmware Interface (UEFI) data capsule with a plurality of payload capsules and a signature data field for each payload capsule.

17. In a system for secure load of binary code having a processor, a data memory device configured to be accessible by the processor, a data capsule configured to be accessible by the processor, the data capsule including a data signature and a network interface device configured to authenticate the data signature over a network using a remote data signature verification server, wherein the data capsule comprises a custom Unified Extensible Firmware Interface (UEFI) data capsule with a plurality of payload capsules and a signature data field for each payload capsule, and the processor is configured to implement the custom UEFI data capsule and each of the plurality of payload data capsules after authenticating the signature data field for the payload data capsule, a method comprising:

executing boot code with the processor;

accessing a data capsule with the processor during the boot process, the data capsule including a data signature;

authenticating the data signature over a network using a remote data signature verification server; and wherein the data capsule comprises a custom Unified Extensible Firmware Interface (UEFI) data capsule with a plurality of payload capsules and a signature data field for each payload capsule, and further comprising implementing the custom UEFI data capsule and each of the plurality of payload data capsules after authenticating the signature data field for the payload data capsule.

* * * * *